United States Patent [19]
Yokoyama

[11] Patent Number: 5,859,396
[45] Date of Patent: Jan. 12, 1999

[54] COMBINATION SWITCH STRUCTURE FOR VEHICLES

[75] Inventor: Toshiaki Yokoyama, Tokyo, Japan

[73] Assignee: Niles Parts Co., Ltd., Japan

[21] Appl. No.: 936,835

[22] Filed: Sep. 25, 1997

[30] Foreign Application Priority Data

Sep. 26, 1996 [JP] Japan ..................................... 8-273936

[51] Int. Cl.⁶ ...................................................... H01H 9/02
[52] U.S. Cl. ..................................... 200/61.54; 200/61.27
[58] Field of Search ............. 200/4, 17 R, 61.27–61.36, 200/61.54; 180/90; 296/70, 72, 74; 307/9.1, 10.1, 132 R, 132 E; 340/439, 461–462

[56] References Cited

FOREIGN PATENT DOCUMENTS 59-85545  6/1984  Japan ............................. H01H 25/09

Primary Examiner—Michael A. Friedhofer
Attorney, Agent, or Firm—Rader, Fishman & Grauer; Ronald P. Kananen

[57] ABSTRACT

A combination switch has a first switch (3) and a second switch (4) inserted and mounted on the right and left sides of a body (1), respectively. The first switch (1) contains a flasher unit (36) comprising MOS. The flasher unit (36) is disposed in a through hole (27c) formed in a plate (27) of the first switch (3). The lead terminal (36a) of the flasher unit (36) is connected with terminals (35c) by means of clips (37) in the through hole (27c) of the plate (27) and soldered therewith. This construction enables a flasher unit to be disposed in a so-called cassette type combination switch.

9 Claims, 3 Drawing Sheets

COMBINATION SWITCH STRUCTURE FOR VEHICLES

BACKGROUND OF THE INVENTION

1. Field of the Invention

The present invention relates generally to switches for automotive vehicles and, in particular, to a combination switch structure for vehicles in which a flasher unit is disposed on a plate of, for example, a vehicle combination switch.

2. Description of the Related Art

A conventional combination switch structure is disclosed, for example, in Japanese Unexamined Utility Model Publication No. 85545/84. This conventional combination switch has a so-called flasher unit installed on a substrate fixed to a bottom of a body. The flasher unit comprises a plurality of electronic devices mounted on the substrate.

However, because the combination switch having the aforementioned conventional flasher unit comprises a plurality of electronic devices mounted on the substrate, the substrate and the entire body must be relatively large. This creates a problem because this conventional combination switch cannot be applied to a so-called cassette type combination switch in which a first column switch and a second column switch are inserted into a body from the right and left of the body and mounted thereon, as disclosed, for example, in Japanese Unexamined Patent Publication No. 40961/84.

SUMMARY OF THE INVENTION

An object of the present invention is to provide a combination switch structure for vehicles that solves the problems with the conventional combination switch structures described above.

More specifically, an object of the present invention is to provide a structure that enables a flasher unit to be contained in a first switch of a conventional cassette type combination switch.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a combination switch is provided In which a first switch and a second switch are inserted into a body from the right and left sides of the body and mounted thereto, and the first switch contains a flasher unit.

The flasher unit preferably comprises MOS and is disposed in a through hole formed in a plate of the first switch. The plate preferably contains terminals connecting with the flasher unit in the through hole. The flasher unit comprises lead terminals, and the lead terminals are connected with the aforementioned terminals by means of clips.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

Figure 1:
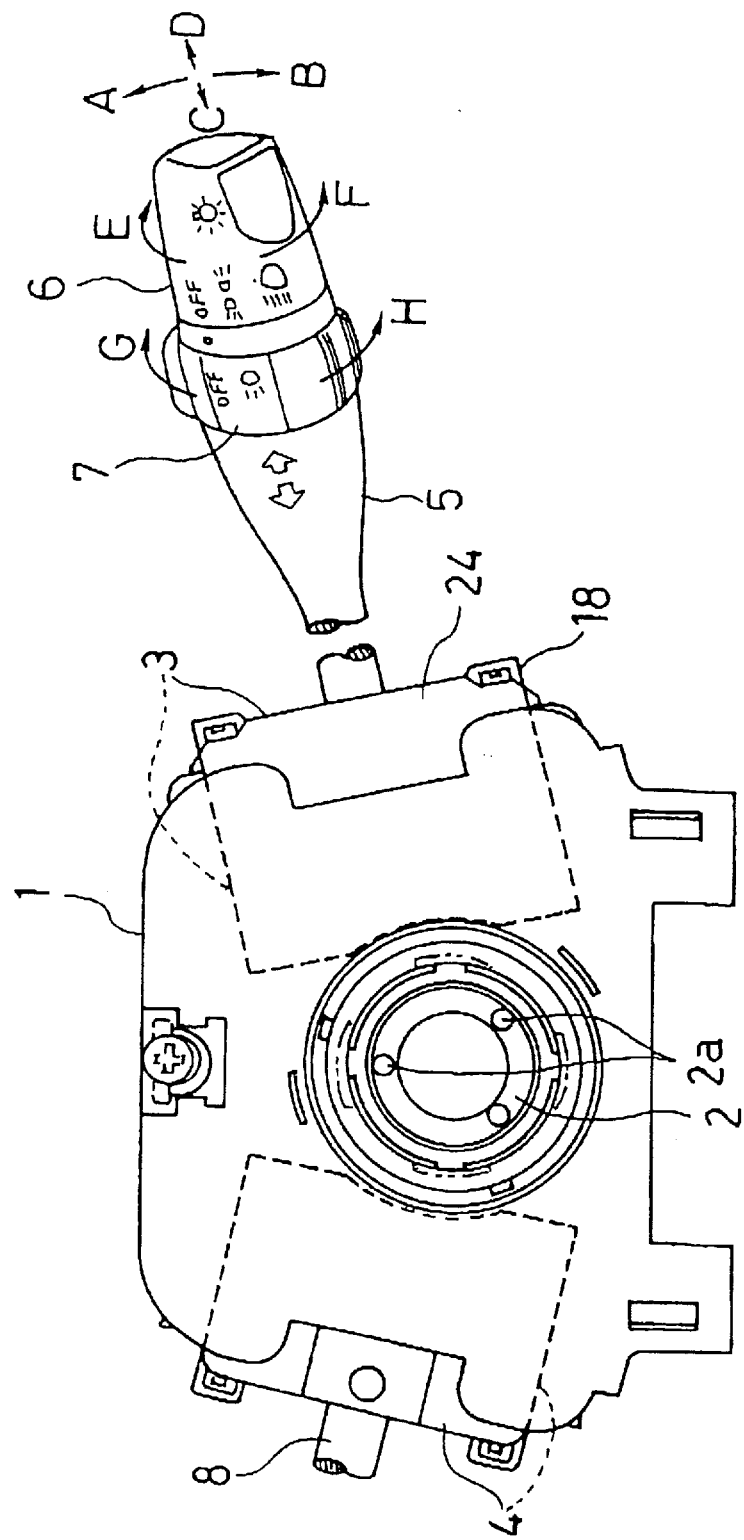
FIG. 1 is a front view having a partial cross section showing a preferred embodiment of the present invention.

A preferred embodiment of the present invention will now be described in detail with reference to FIGS. 1 to 3 of the accompanying drawings.

A combination switch for vehicles has a body 1 screwed to a steering column (not shown) of a vehicle. A cylindrical tube 2 having cancel pins 2a is journaled rotatably in the center portion of the body 1. The body 1 contains a first switch 3 to the right and a second switch 4 to the left, the switches 3, 4 being inserted into the body 1 from the right and the left, respectively, and mounted thereon.

The first switch 3 functions, for example, as a turn signal switch, a passing switch, a main dimmer select switch, a front lamp switch, and a fog lamp switch. The turn signal switch function of the first switch 3 makes the turn signal lamps blink when an operating lever 5 is operated to the left and right indicated by the arrows A and B, respectively. The passing switch function of the first switch 3 makes the front lamp instantaneously light up if the operating lever 5 is operated upward, as indicated by the arrow C. Further, the main dimmer switch function of the first switch 3 changes over main and dimmer modes of the front lamp if the operating lever 5 is operated up or down, as indicated by the arrows C and D, respectively.

The first switch 3 functions as the front lamp switch which turns the front lamp and small lamps on and off if a first rotating knob 6 provided on a front end of the operating lever 5 is turned in directions indicated by the arrows E and F. Further, the first switch 3 functions as the fog lamp switch which turns the fog lamp on and off when a second rotating knob 7 is turned in directions indicated by the arrows G and H.

A second switch 4 journals swingably an operating lever 8 having a function of, for example, a wiper-washer switch. The operating lever 8 can be operated up and down and to the right and left, like the aforementioned operating lever 5, and contains rotary switches at a front end thereof for wiper volume, rear wiper volume or the like.

Figure 2:
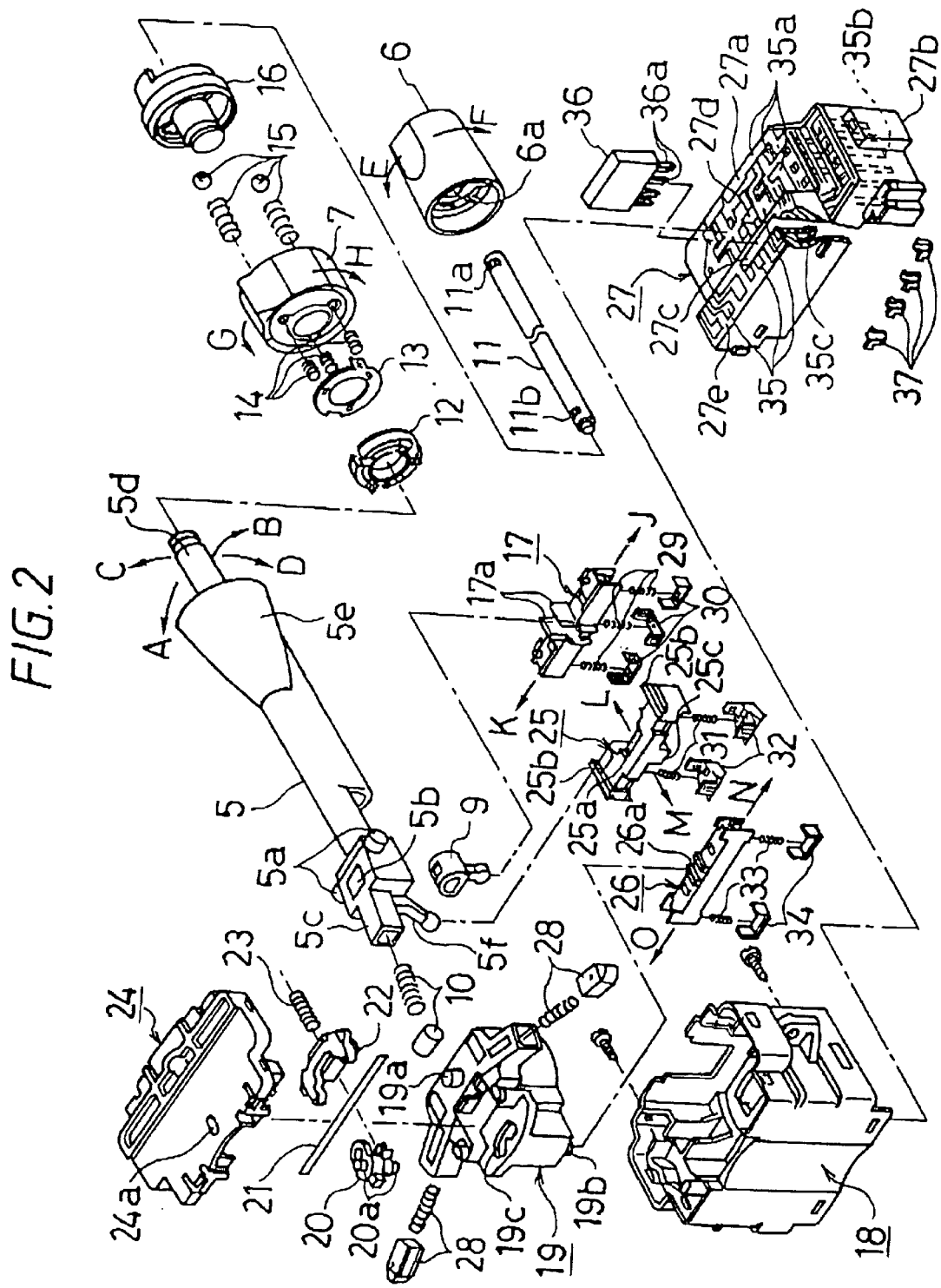
FIG. 2 is an exploded perspective view of a first switch according to a preferred embodiment of the present invention.

The operating lever 5 of the aforementioned first switch 3 is rotated in directions indicated by the arrows C and D with respect to a shaft 5a, as shown in FIG. 2. The operating lever 5 is a substantially cylindrical operating member and contains a through hole 5b in which an operating lever 9 is disposed. The through hole 5b is formed in the vicinity of the shaft 5a. The operating lever 5 has a first cylindrical portion in which a moderating member 10 is disposed at one end thereof, and a shaft 11 is disposed at the other end thereof. Further, the operating lever 5 has a second cylindrical portion 5d on which a substrate 12, a movable contact piece 13, a contact spring 14, the second rotating knob 7, moderating members 15, and a fixing member 16 are disposed.

The operating lever 5 has a second operating lever 5f formed integrally therewith under a portion in the vicinity of the first cylindrical portion 5c, the second operating lever 5f being floatingly engaged with an engaging hole 25a in a second movable element 25. If the operating lever 5 is operated in directions indicated by the arrows C and D, the second movable element 25 is moved linearly in directions indicated by the arrows L and M, thereby realizing the main dimmer selection and passing function.

A first rotating knob 6 has an axial hole 6a formed in the center thereof. An elastic fixing pawl (not shown) formed in the axial hole 6a is engaged with a fixing groove 11a in the shaft 11 so that the first rotating knob 6 is fixed to the shaft 11. If the first rotating knob 6 is rotated in directions indicated by the arrows E and F, the operating lever 9 fixed to the other end of the shaft 11 moves the first movable element 17 linearly in directions indicated by the arrows J and K, thereby turning the front lamp on and off.

A second rotating knob 7 is an operating member having a substantially doughnut shape. When the knob 7 is rotated in directions indicated by the arrows H and G, the fog lamp is turned on and off. The second rotating knob 7 fixes the movable contact piece 13 through the contact spring 14 on a side of a case 18 and has moderating members 15 on a side of the first rotating knob 6. The second rotating knob 7 is put to the second cylindrical portion 5d of the operating lever 5 so that the second cylindrical portion 5d passes therethrough and is rotatably nipped by a trumpet-shaped opening portion 5e and the fixing member 16 fixed to the second cylindrical portion 5d.

Figure 3:
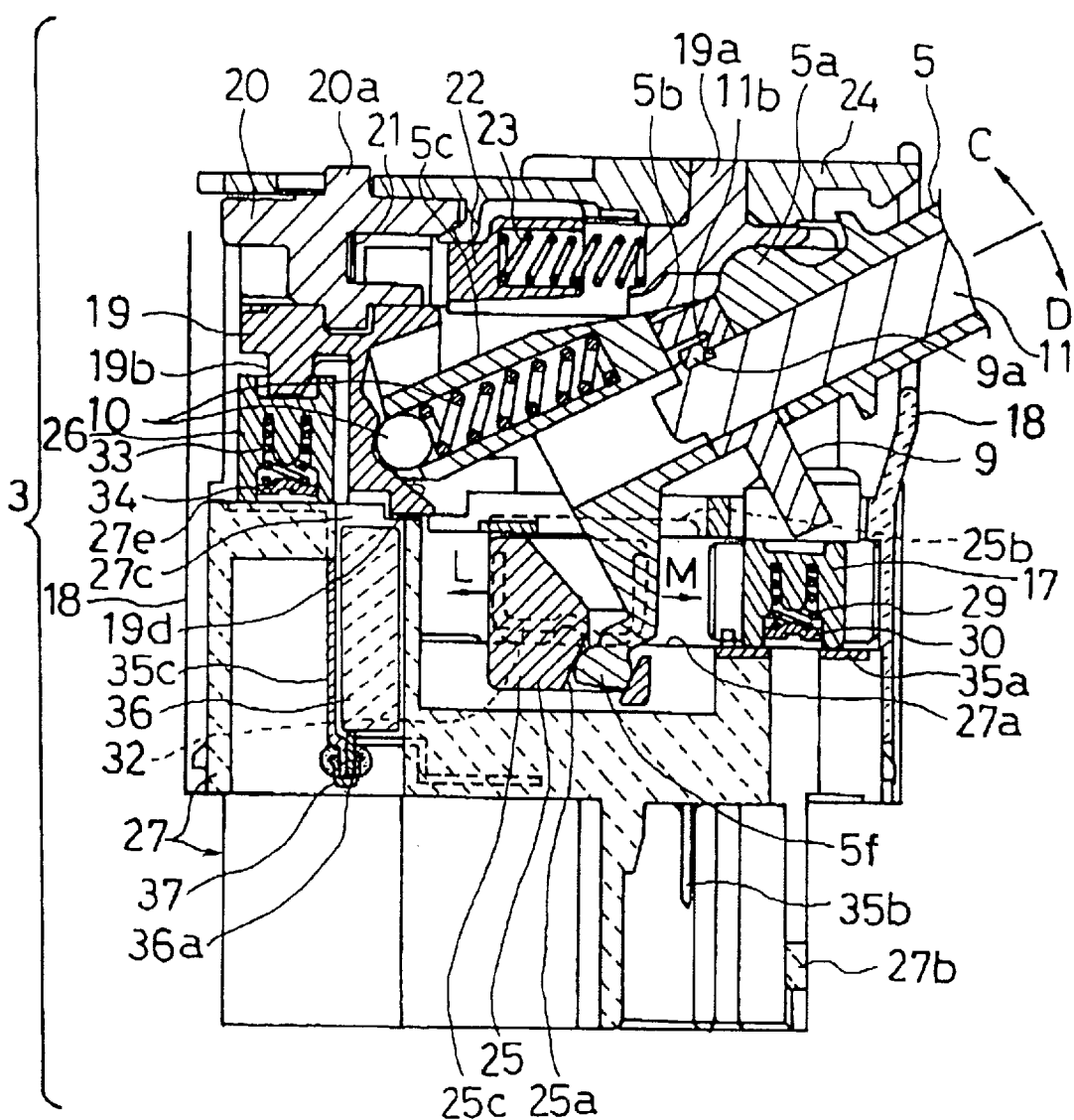
FIG. 3 is an enlarged sectional view of the first switch according to a preferred embodiment of the present invention.

As shown in FIG. 3, the operating lever 9 is journaled at an end of the shaft 11 by engaging its elastic fixing pawl 9a with a fixing groove 1ib in the shaft 11. The operating lever 9 is rotated together with the shaft 11 and the first rotating knob 6 and is engaged with fixing protruded pieces 17a such that a rotation of the first rotating knob 6 is converted to a linear motion of the first movable element 17.

The moderating member 10 comprises, for example, a coil spring and a cylindrical moderating piece. The moderating member 10 is contained in a first cylindrical portion 5c, as shown in FIG. 3, and in contact with a moderating groove 19d formed in an internal wall of a movable base 19. The substrate 12 has fixing contact points for contacting the movable contact piece 13 and is fit in the opening portion 5e. The moderating members 15 comprise coil springs and steel balls and are springly mounted to the second rotating knob 7. The steel balls of the moderating members 15 are pressure-fit to moderating grooves formed in an internal face of the fixing member 16 on a side of the second rotating knob 7.

The case 18 is closed by a lid member 24 through a movable plate 19, a cancel cam 20, a leaf spring 21, a cam guide 22 and a coil spring 23, which are disposed on a top of the case 18. The case 18 is closed by a plate 27 through a first movable element 17, a second movable element 25, and a third movable element 26, these elements being disposed under the case 18. The case 18 contains the aforementioned respective parts and is engaged in the body 1 and screwed thereto.

The movable plate 19 has moderating members 28 each springly mounted on the right and left sides and is rotated together with the operating lever 5 in directions indicated by the arrows A and B with respect to a shaft 19a. The movable plate 19 has a third operating lever 19b formed on a bottom thereof such that it protrudes to engage with an engaging portion 26a of the third movable element 26. If the operating lever 5 is operated in a direction indicated by the arrows A and B, the third movable element 26 is moved linearly in directions indicated by the arrows N and O, thereby turning on the turn signal lamp.

The cancel cam 20 has upper and lower vertical shaft portions 20a. The lower shaft 20a is floatingly engaged with a groove 19c in a movable plate 19, and the upper shaft 20a is floatingly engaged with an oval hole 24a in the lid member 24. Both ends of the leaf spring 21 are held by the lid member 24 so that the leaf spring 21 presses the cancel cam 20 in the center thereof so as to urge the cancel cam 20. The cam guide 22 is mounted on the movable plate 19 and urged by the coil spring 23 toward the aforementioned cancel cam 20. The lid member 24 is fit to an upper opening end of the case 18.

The first movable element 17 fixes movable contact pieces 30 for the front lamp switch through contact springs 29. The movable contact pieces 30 and the contact springs 29 are disposed below the first movable element 17. If the first rotating knob 6 is rotated, the first rotating element 17 moves together with the contact springs 29 and the movable contact pieces 30 over a first plate surface 27a of the plate 27 in directions indicated by the arrows K and J.

The second movable element 25 fixes movable contact pieces 32 for the main dimmer switch and passing switch through contact springs 31. The movable contact pieces 32 and the contact springs 31 are disposed below the second movable element 25. If the operating lever 5 is operated in directions indicated by the arrows C and D, the second movable element 25 moves together with the contact springs 31 and the movable contact pieces 32 over the first plate surface 27a in directions indicated by the arrows L and M.

An engaging hole 25a of the second movable element 25 is oval. If the operating lever 5 is operated in directions indicated by the arrows A and B, the second operating lever 5f moves to the engaging hole such that the operating lever 5f is free and the second movable element 25 is not moved. Reference numeral 25b designates guide arms which slide along internal walls of the case 18 so as to prevent the second movable element 25 from being loose. Reference numeral 25c designates a guiding protrusion formed on a bottom face of the second movable element 25, which is engaged with a guiding hole 27d in the first plate surface 27a. The second movable element 25 is guided by the guiding arms 25b and the guiding protrusion 25c such that it moves linearly in a desired direction without being loose.

The third movable element 26 has movable contact pieces 34 for the turn signal switch which are biased by contact springs 33. The movable contact pieces 34 and the contact springs 33 are disposed under the third movable element 26. If the operating lever 5 is operated in directions indicated by the arrows A and B, the third movable element 26 moves together with the contact springs 33 and the movable contact pieces 34 over a second plate surface 27e of the plate 27 in directions indicated by the arrows N and 0. An engaging portion 26a comprises, for example, two rail-shaped protrusions. If the operating lever 5 is operated in directions indicated by the arrows C and D, the third operating lever 19b moves in the engaging portion 26a such that the lever 19b is free, but the third movable element is not moved.

The plate 27 is formed by insert molding of resin with a conductive plate 35 and mounted to the lower opening portion of the case 18. The plate 27 has the first plate surface 27a and the second plate surface 27e. The first movable element 17 and the second movable element 25 are placed on the lower first plate surface 27a. The third movable element 26 is placed on the upper second plate surface 27e. The plate 27 is formed integrally with a connector portion 27b and insert-molded with the conductive plate 35. A through hole 27c in which a flasher unit 36 is disposed is formed in the second plate surface 27e.

The conductive plate 35 comprises a fixed contact plate 35a disposed on the first plate surface 27a and the second plate surface 27e, a terminal 35b disposed in the connector portion 27b, and a terminal 35c disposed in the through hole 27c. The terminal 35c is bent so as to coincide with a bottom end of a lead terminal 36a of the flasher unit 36 in the vicinity of a lower opening end of the through hole 27c. The terminal 35c is coupled with the aforementioned lead terminal 36a via clips 37 made of U-shaped metallic plates in the through hole 27c and soldered thereto.

The flasher unit 36 comprises, for example, MOS (Metal Oxide Semiconductor) or the like and is connected with respective terminals 35c in the through hole 27c and disposed in the through hole 27c.

An operation of the preferred embodiment having the above-described structure will now be explained in detail.

Because the flasher unit 36 is constructed with MOS and disposed within the through hole 27c in the plate 27, space saving is realized and a size of the plate 27 can be reduced. Thus, a size of the first switch 3 can be reduced, and the combination switch containing the flasher unit 36 can be constructed as a cassette type combination switch, thereby allowing the first switch 3 to be fit to the body 1.

Further, because the flasher unit 36 is disposed in the through hole 27c, there is no possibility that the flasher unit 36 may be in contact with other members when the plate 2 is assembled to the case 18. Thus, assembly performance of the plate 27 can be improved, thereby preventing the flasher unit 36 from striking the other members and being damaged.

Further, because the flasher unit 36 is disposed in the through hole 27c formed in the second plate surface 27e, space saving can be realized and the third movable element 26 is not blocked from sliding. Still further, because the bottom end of the lead terminal 36a is connected with the terminal 35c with the clips 37 and to be soldered, the soldering procedure is facilitated.

As a result of the above-described structure, the present invention provides the following effects.

A combination switch is provided in which a first switch and a second switch are inserted into a body from the right and left of the body and mounted thereto, and the first switch contains the flasher unit. Accordingly, a size of the entire combination switch can be reduced.

Because the flasher unit comprises MOS, it is possible to reduce a size of the first switch and then provide a so-called cassette type combination switch containing the flasher unit.

Because the flasher unit is disposed in a through hole formed in a plate of the first switch, it is possible to reduce a size of the first switch and, at the same time, prevent the flasher unit from striking the other members, thereby improving assembly performance of the combination switch.

Because the plate contains terminals connecting with the flasher unit in the through hole, it is possible to connect the flasher unit in the through hole, thereby realizing space saving, and further prevent the flasher unit from being in contact with a first movable element, a second movable element and a third movable element, thereby improving switch actions.

Because the flasher unit comprises lead terminals connected with the aforementioned terminals of the plate by means of clips, a soldering procedure for connecting the lead terminals with the terminals is facilitated.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claim is:

1. A combination switch structure for vehicles, comprising:

a first switch (3) and a second switch (4) which are inserted to a body (1) from first and second respective sides of said body (1) and mounted thereto, said first switch comprising a plate (27) having a plurality of fixed contacts on a surface thereof and a through hole (27c) formed in said plate, said first switch further comprising a flasher unit (36) disposed in said through hole (27c).

2. The combination switch structure for vehicles as claimed in claim 1, wherein said flasher unit (36) comprises MOS.

3. The combination switch structure for vehicles as claimed in claim 2, wherein said plate (27) contains terminals (35c) connecting with said flasher unit (36) in said through hole (27c).

4. The combination switch structure for vehicles as claimed in claim 3, wherein said flasher unit (36) comprises lead terminals (36a), and said lead terminals (36a) are connected with said terminals (35c) of said plate (27) by means of clips (37).

5. The combination switch structure for vehicles as claimed in claim 1, wherein said plate (27) contains terminals (35c) connecting with said flasher unit (36) in said through hole (27c).

6. The combination switch structure for vehicles as claimed in claim 5, wherein said flasher unit (36) comprises lead terminals (36a), and said lead terminals (36a) are connected with said terminals (35c) of said plate (27) by means of clips (37).

7. A combination switch structure for vehicles, comprising:

a switch body (1) having a first side opening, a second side opening, and a cylindrical tube (2) rotatably journaled in said switch body between said first and second side openings;

a first switch (3) disposed in said first side opening and mounted to said switch body (1), said first switch (3) comprising a pivotally mounted operating lever (5) for actuating a turn signal switch function and a headlight dimmer switch function, a first rotating knob (6) for actuating a front lamp switch function, and a second rotating knob (7) for actuating a fog lamp switch function, said first switch (3) further comprising a plate (27) having a through hole (27c) and terminals (35c) disposed in said through hole, and a flasher unit (36) comprising MOS disposed in said through hole (27c), said flasher unit (36) having lead terminals (36a) which are connected to the terminals (35c) disposed in said through hole (27c); and a second switch (4) disposed in said second side opening and mounted to said switch body (1), said second switch (4) comprising an operating lever (8) for actuating a wiper-washer switch function.

8. The combination switch structure for vehicles according to claim 7, wherein said first switch comprises first, second, and third movable elements supporting first, second, and third groups of movable contact pieces, said groups of movable contact pieces being selectively engaged with respective groups of fixed contacts on said plate.

9. The combination switch structure for vehicles according to claim 8, wherein said through hole is formed in said plate between adjacent groups of said fixed contacts.

* * * * *